W. A. ORR & H. D. JOHNSON.
TRAIN PIPE COUPLING.
APPLICATION FILED SEPT. 7, 1907.
905,916.
Patented Dec. 8, 1908.
6 SHEETS—SHEET 3.
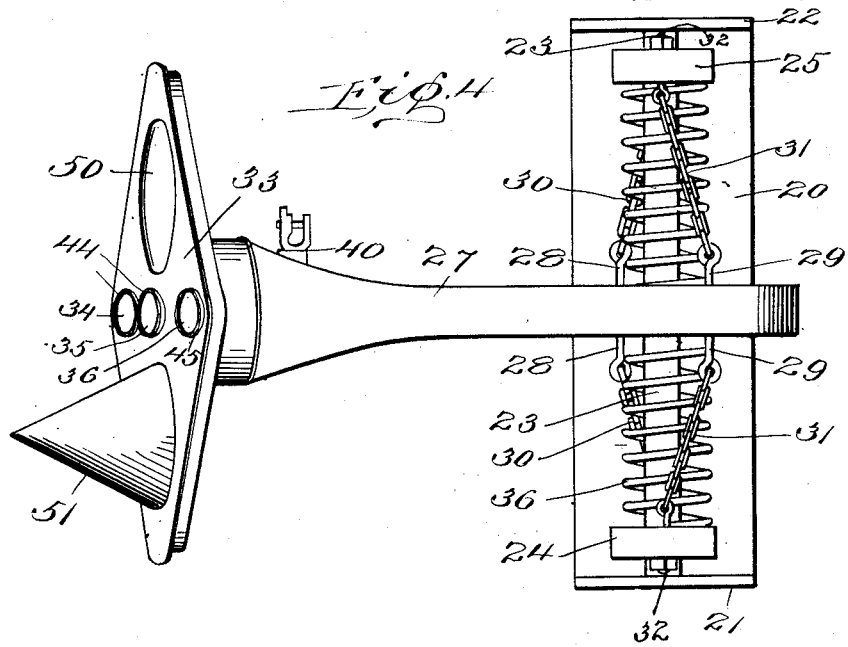
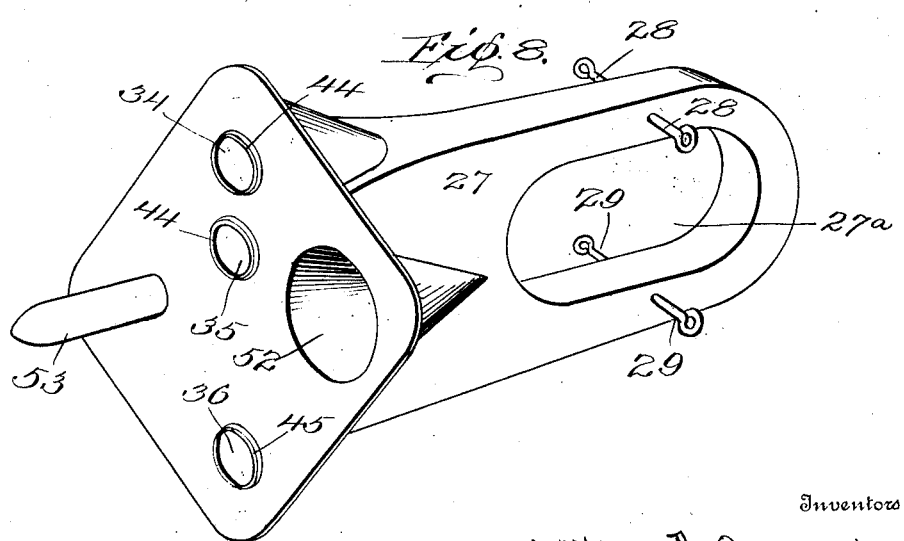
Witnesses
J. M. Fowler Jr
L. L. Morrill.
Inventors
William A. Orr and
Hubert D. Johnson,
By Mason Fenwick & Lawrence,
Attorneys

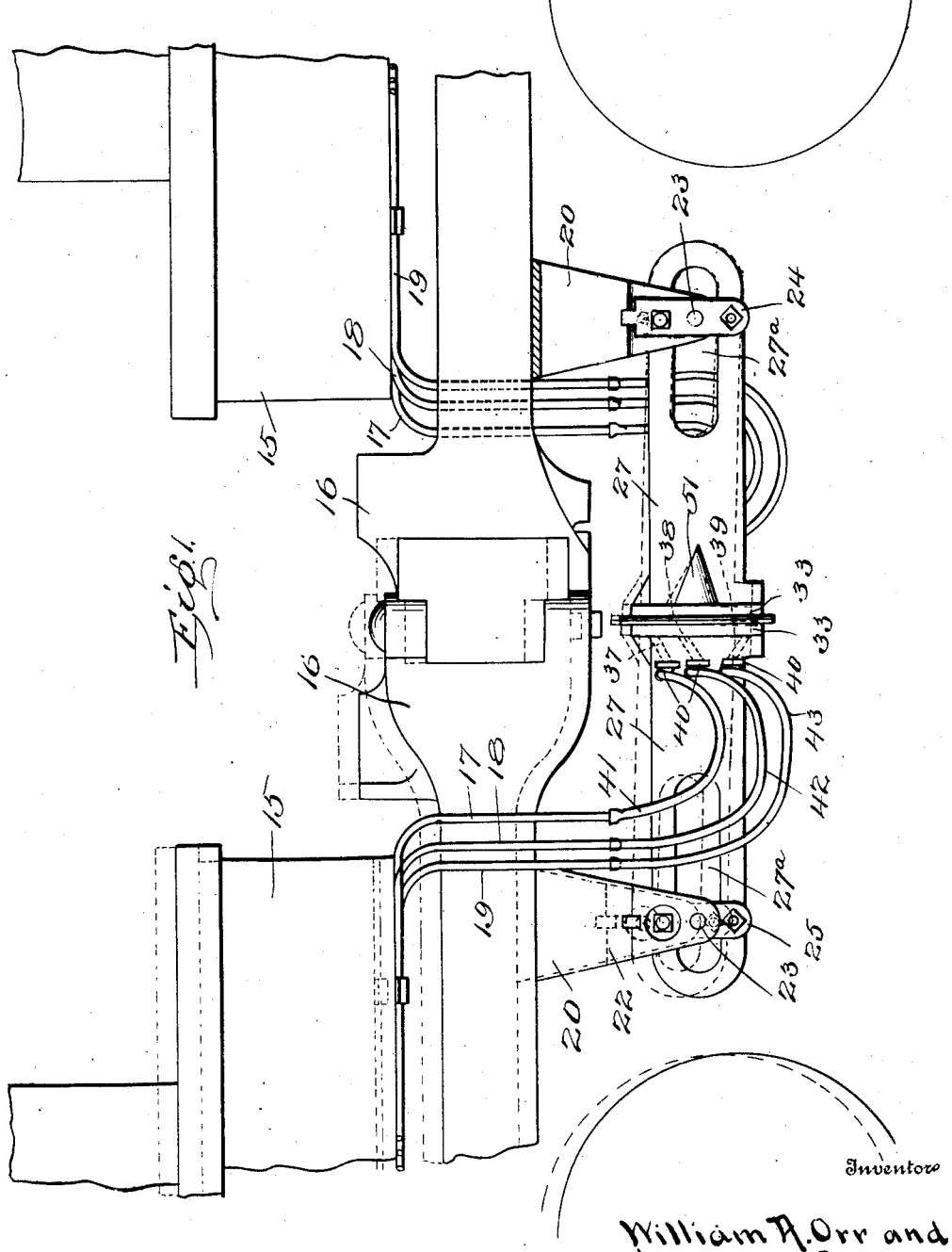

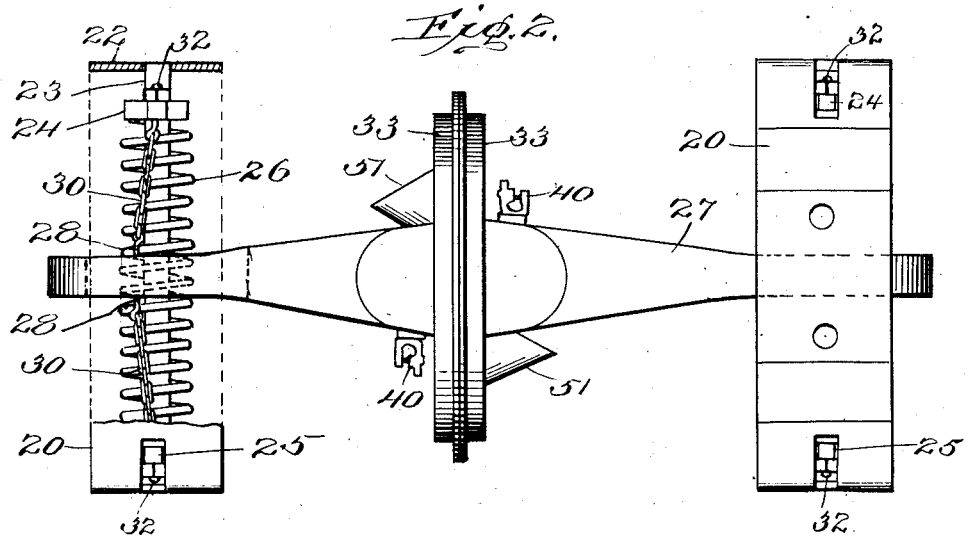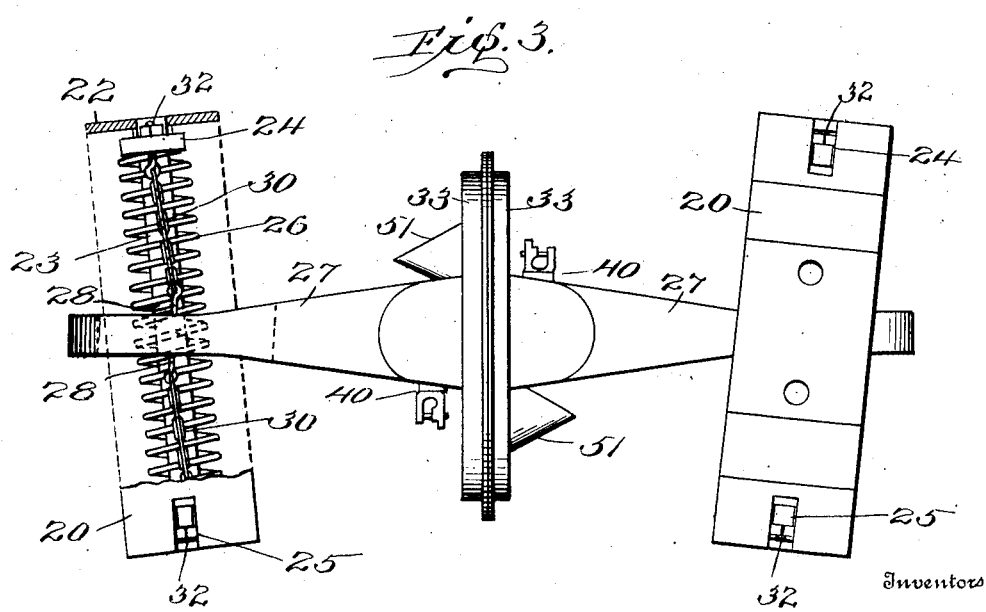

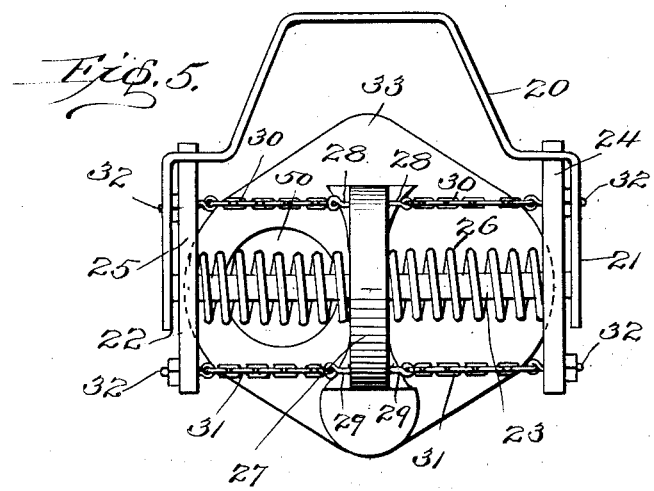
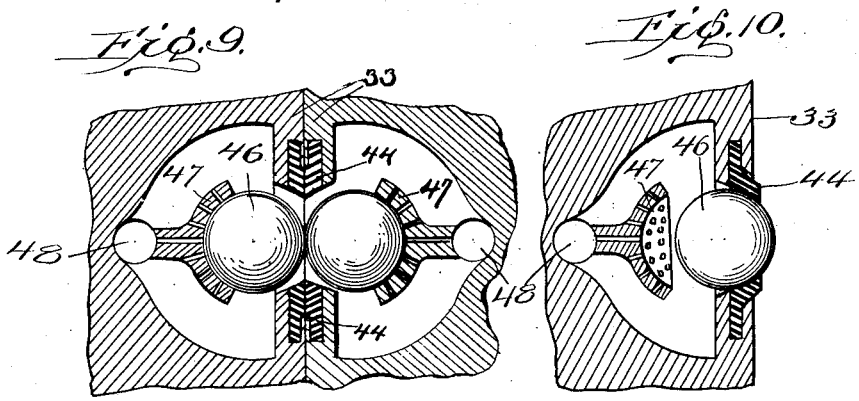
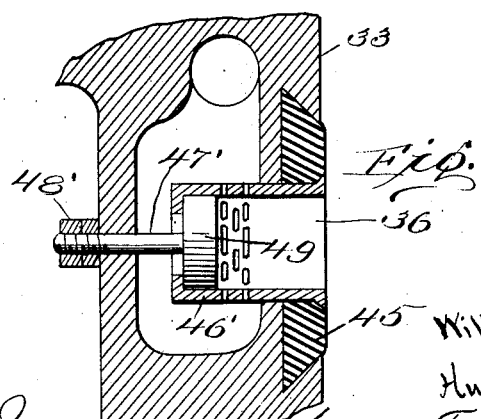

W. A. ORR & H. D. JOHNSON.
TRAIN PIPE COUPLING.
APPLICATION FILED SEPT. 7, 1907.
905,916.
Patented Dec. 8, 1908.
6 SHEETS—SHEET 5.
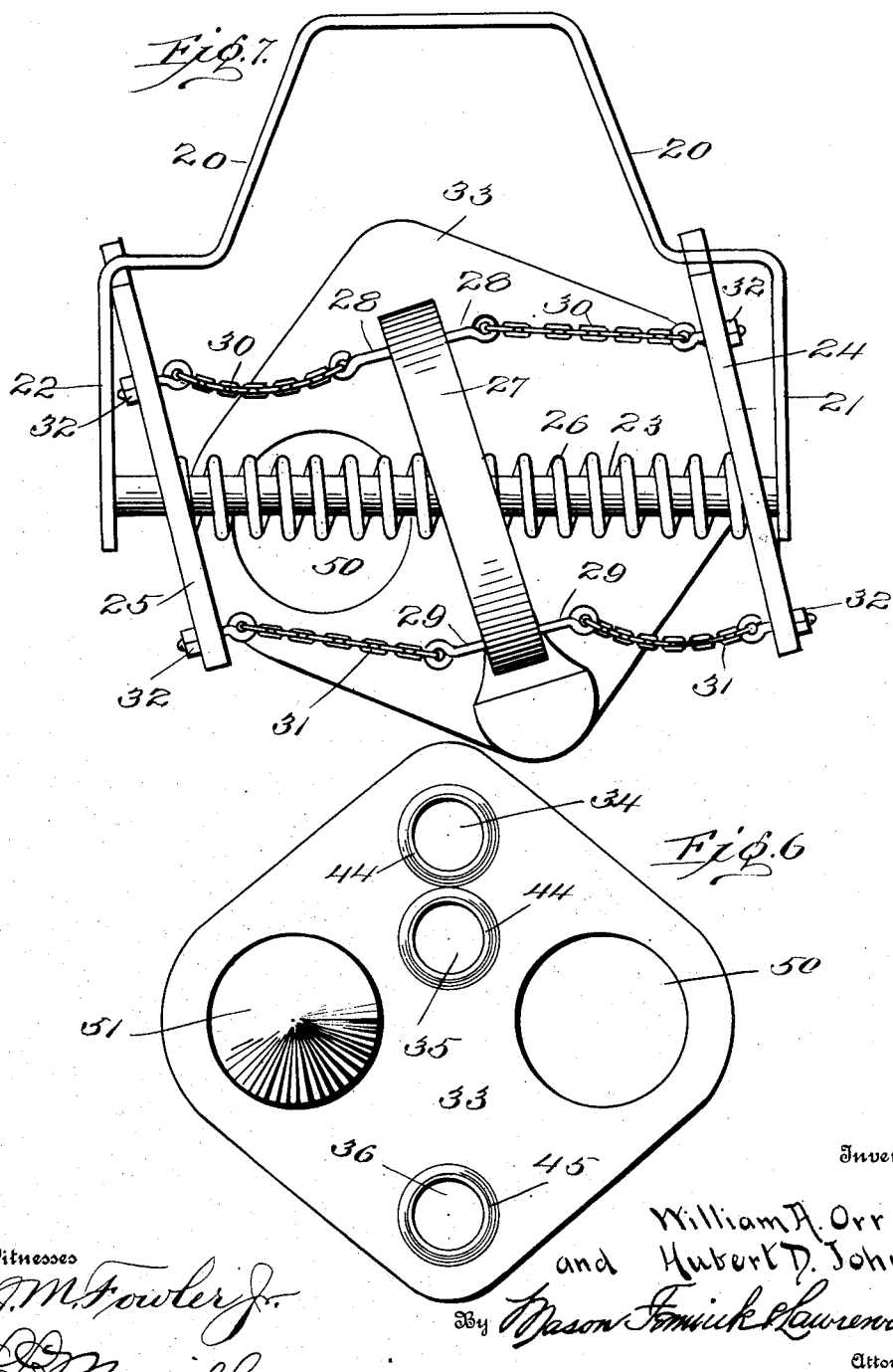

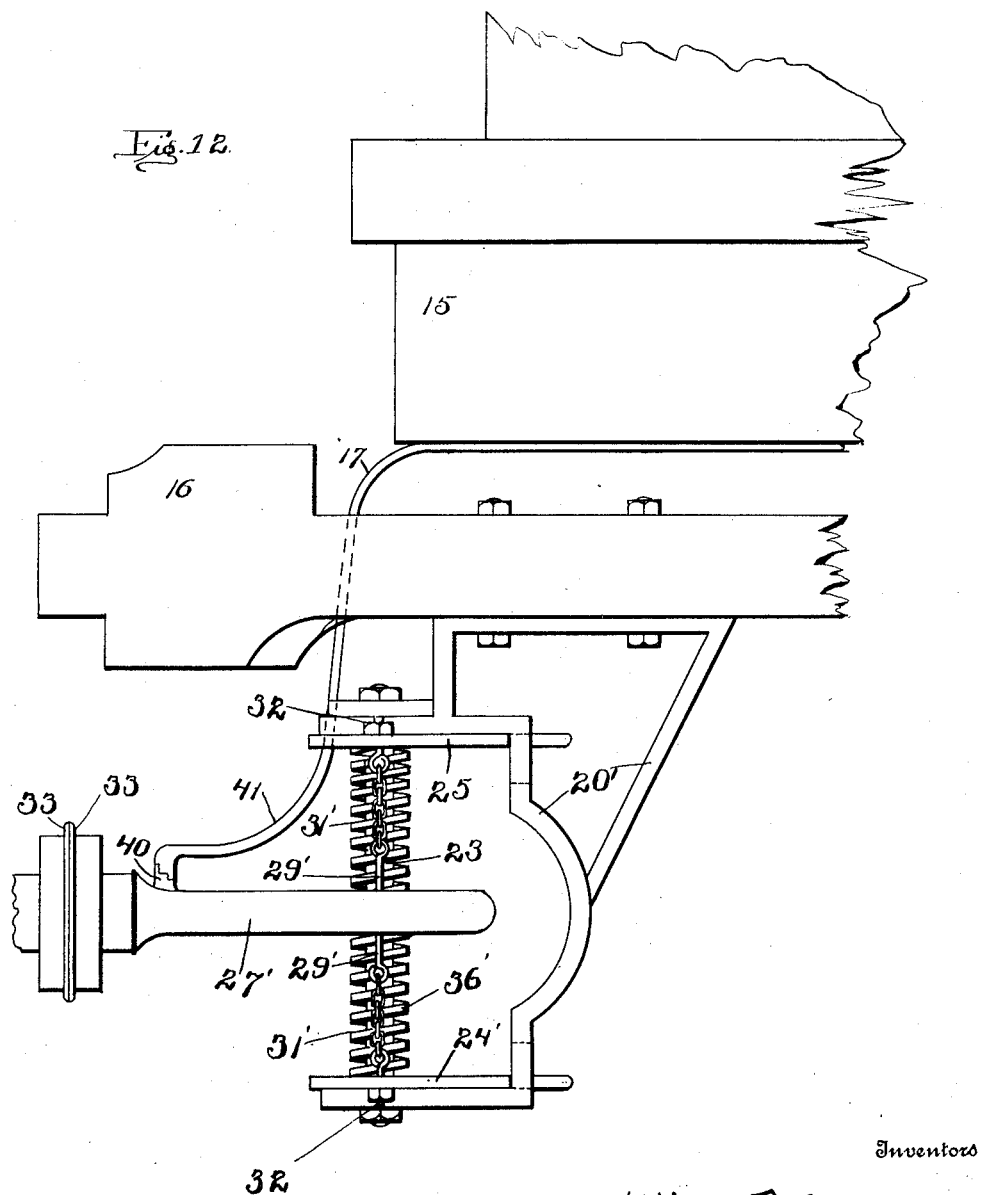

UNITED STATES PATENT OFFICE.

WILLIAM A. ORR, OF PITTSTON, AND HUBERT D. JOHNSON, OF SCRANTON, PENNSYLVANIA.

TRAIN-PIPE COUPLING.

No. 905,916.　　　　Specification of Letters Patent.　　　Patented Dec. 8, 1908.

Application filed September 7, 1907. Serial No. 391,834.

*To all whom it may concern:*

Be it known that we, WILLIAM A. ORR, a citizen of the United States, and resident of Pittston, county of Luzerne, and State of Pennsylvania, and HUBERT D. JOHNSON, a citizen of the United States, residing at Scranton, in the county of Lackawanna and State of Pennsylvania, have invented certain new and useful Improvements in Train-Pipe Couplers; and we do hereby declare the following to be a full, clear, and exact description of the invention, such as will enable others skilled in the art to which it appertains to make and use the same.

This invention relates to couplers for train pipes and has for an object to provide a coupler adapted to conform to all possible movements of a train and the individual cars of a train, and to automatically couple the several train pipes when the cars are coupled.

A further object of the invention is to provide in a device of the class an absolutely universal joint connecting the train pipe coupler with the coupler of the cars.

A further object of the invention is to provide improved means facilitating the employment of the improved train pipe coupler with train pipe couplings usually and ordinarily in use.

With these and other objects in view, the invention comprises certain novel constructions, combinations and arrangements of parts, as will be hereinafter fully described and claimed.

In the drawings:—Figure 1 is a view in side elevation of the ends of two conventional cars coupled by a conventional coupling showing in side elevation an improved train pipe coupler with some parts broken away to show the structure. Fig. 2 is a top plan view of the couplers in engagement with certain parts of the connecting means broken away and showing the position when the cars are coupled and the train pipe couplers held in association by the spring employed. Fig. 3 is a view similar to Fig. 2 showing the means for facilitating the turning of curves and for holding the train pipe coupler in association during such turning. Fig. 4 is an inverted perspective showing the connecting means in inverted plan and with the coupler member bent downwardly or toward the observer. Fig. 5 is a view of the coupler and connections in rear elevation. Fig. 6 is a view of one of the contact faces of the coupler shown in front elevation. Fig. 7 is a view of the coupler connecting parts in rear elevation showing the coupler turned at an angle to the connecting means as when one car occupies a different plane transversely from the adjacent car. Fig. 8 is a perspective view of a slightly modified form of coupler member. Fig. 9 is a sectional view of the face of the coupler showing a ball valve adapted to close the ports when the cars are uncoupled, Fig. 10 being a similar view with the valve member closed. Fig. 11 is a sectional view of the improved means for coupling the steam-carrying train pipe. Fig. 12 is a view in side elevation of a conventional car with a slightly modified form of air coupler connection associated therewith.

Like characters of reference designate corresponding parts throughout the several views.

The improved train pipe coupler forming the subject-matter of this application is adapted for association with any approved and ordinarily employed cars shown conventionally at 15 and in association with any approved ordinary couplers shown conventionally at 16. While the coupler is, as noted, adapted for use in association with any cars it is found more desirable for use in connection with passenger cars, as passenger cars ordinarily carry train pipes, as 17, controlling the air brakes; pipes 18, controlling the whistle, and pipes 19 carrying steam for heating the coaches, and when such a number of train pipes are employed the work of coupling the several pipes requires considerable time which is avoided by the employment of an automatic coupler such as disclosed in this application.

Beneath the couplers 16 are suspended stirrups or connecting members 20 preferably curved and formed as shown particularly in rear elevation at Figs. 5 and 7, and embodying spaced plate-like portions 21 and 22 between which extends a rod 23 having followers plates 24 and 25 slidably mounted thereon and held normally in the position shown in Fig. 5 by a spring 26 which yieldingly resists the approach of the said followers 24 and 25 toward each other.

The coupler members comprise shanks 27 having openings or slots 27ᵃ formed therethrough and embracing the spring 26 and rod 23 and provided with eye-bolts 28 and 29 connected respectively with the upper and lower ends of the followers 24 and 25 by means of chains 30 and 31 and placed under tension by means of screw-bolts and nuts 32.

It will be obvious that any movement of the shank 27 with reference to the rod 23 will tend to tighten certain of the chains, as indicated in Figs. 2, 3, 4, and 7, thereby placing the spring 26 under compression. Referring to Fig. 7, for instance, the followers plates 24, and 25 are swung from their normal vertical position in proximity to members 21 and 22 and thereby cause the spring, which is continuous and passes freely through the shank 27, to occupy less space, under which conditions it is of course under compression.

The forward or extreme outer end of the coupler member is provided with a contact face 33 provided with ports as 34, 35 and 36, in communication respectively with the train pipes 17, 18 and 19 by means of passages 37, 38 and 39 formed within the shank of the coupler member and communicating with fastening members 40 extending laterally from the shank of the coupler member and adapted for engagement with flexible pipes or hose 41, 42 and 43, forming, respectively, continuations of the train pipes 17, 18 and 19, the said coupling members 40 being the usual and ordinary coupling members so that the hose 41, 42 and 43 may be readily and conveniently disconnected from the coupling members and connected with similar coupling members upon a car not provided with the improved coupler. About the ports 34, 35 and 36 formed in the face of the coupler are preferably secured gaskets 44 about the two air ports and 45 about the steam port 36.

It is ordinarily not found necessary to employ any automatic valve in association with the air ports, as especially when the coupler is used upon passenger cars the plug valves usually and ordinarily employed to cut off the air are sufficient. In some instances, however, it is found desirable to employ automatic valves and in Figs. 9 and 10 such a valve is shown especially designed for association with the two air pipes and comprises a ball valve 46 preferably of elastic material adapted to close the port and engage the gasket 44 and to be seated in a concave perforate cup 47 when not employed to close the port. The opening 48 is in communication with the train pipes and the perforations through the cup admit air under pressure to engage the rearward side of the ball to close the ball to the position shown at Fig. 10 when the cars are uncoupled and when the cars are coupled to force the ball inwardly to seat or approximately to seat in the cup, as shown in Fig 9.

For connecting the steam pipe a different form of connection is found desirable and is here shown comprising a gasket 45 maintained in position by means of a perforate sleeve 46' which, in turn, is held in position by a bolt 47' extending through the rear wall of the face of the coupler and engaged by nuts 48' and having a head 49 within the sleeve 46'. When the opposing coupler engages the gasket 45 the outer edge of the sleeve 46' is also engaged by the opposing sleeve and the sleeve moved inwardly the gasket yielding therefor so that the outer ends of the sleeves 46' produce practically a steam tight joint reinforced by the gasket 45. The sleeve 46' is permitted movement by reason of being loosely mounted upon the head 49 of the bolt and movable toward the rear wall of the coupler member.

To insure a proper and automatic positioning of the contact faces each face is provided upon one side with an opening 50 and upon the opposite side with a conical finder 51 proportioned to be inserted through the opening 50 and to properly position contact faces 33 when the couplers are in coupled position.

When the coupling members are in normal position with cars uncoupled the contact faces extend a little distance beyond the line of contact with a similar contact face of an adjacent car so that when the contact members are in engagement the coupling members and shanks are forced rearwardly, as shown in Fig. 2, and by reason of forcing the eye-bolts 28 and 29 rearwardly the followers 24 and 25 are forced to approach each other against the tension of the spring 26, which being of considerable resisting power forces the contact members together with great firmness. In case the cars after being coupled pass around a curve the curvature is compensated for by the springs, as shown in Fig. 3, the moving of the shank 27 angularly relative to the rod 30 also compressing the spring 26, such compression serving to return the coupler at once to normal position when the curvature has been passed. In case the coupler is forced either upwardly or downwardly as shown in dotted lines in Fig. 1, the movement of the eye-bolts 28 and 29 relative to the rod 23 causes the followers 24 and 25 to approach each other, as shown in Fig. 4, also against the tension of the spring 26, which normally holds the coupler in horizontal position when not in use. In case the transverse plane of cars are different when coupling is accomplished either or both coupling members may turn as shown in Fig. 7, whereby one of the chains 30 and one of the chains 31 is tightened against the tension of the spring 26, while the other is slack causing the coupler shank to right itself immediately upon such pressure being removed.

Instead of employing the coupler with the horizontal or transverse spring as shown in Figs. 1 to 7 inclusive the spring may be disposed vertically as shown in Fig. 12 with the supporting member 20′ formed in any approved manner as shown in such figure. It will be seen that by reason of the compression of the spring 36′ the coupler shank 27′ will be maintained in horizontal or operative position the same as though the spring were in horizontal position and that the shank and coupler associated with the vertical spring will be capable of any and all movements of which it is capable when associated with the horizontal spring. It will thus be seen that the coupler shank is capable of movement in any direction and any desired movement forwardly, downwardly, angularly with the rod 23 as the center or angularly with the major axis of the shank as the center or any or all of such motions simultaneously and combined.

The contact face of the coupler is made large enough to insure the contacting members being maintained always in alinement so that the contacting or registering ports of the contacting members are held always in proper position and by reason of the gaskets above described, an air or steam tight joint is insured. Instead of employing the opening 50 and conical finder 51 a conical pocket 52 may be formed in the coupler with an opening through the contact face and with a finger or finder rod 53 extending from the opposite side of the face and positioned to automatically enter the conical pocket 52 and position the contact faces in the same manner as they are positioned by the employment of the cone 51 and the opening 50.

While there are many improved and novel features entering into this invention, particular stress is laid upon the importance of the connection between the coupler and the car, providing as it does an absolutely universal joint permitting the coupler member and shank to move in any direction under strain to which it may be subjected and to be returned instantly to normal position when such strain is removed.

What we claim is:—

1. In a device of the class described, a connecting member, a coupling member arranged to be moved in any direction, and a resilient member arranged to be placed under compression by any movement of the coupler and to return the coupler to normal position when released.

2. In a device of the class described, an attaching member, a coupling member, capable of movement in any direction, a spring disposed transversely relative to the coupler and arranged to be placed under compression at every movement of the coupler and to return the coupler to normal position when released.

3. In a device of the class described, a connecting member, a coupling member associated with the connecting member and capable of movement in any direction, a spring carried by the connecting member, and means connecting the coupler with the spring whereby the spring is placed under compression at every movement of the coupler and adapted to return the coupler to coupling position when the coupler is released.

4. In a device of the class described, a coupling member, spring retained follower plates and flexible devices for supporting the coupling member, means carried by the coupling member adapted to automatically engage a similar coupling member, flexible train pipes, and separable coupling members whereby the flexible train pipes may be disconnected from the coupler.

5. In a device of the class described, a coupler member spring retained follower plates and flexible devices supporting the coupling member, said member provided with a contact face proportioned to automatically engage a similar contact face, and having a port communicating with the surface of the contact face, and a flexible train pipe in communication with the port at a point removed from the face, said pipe being adapted to be disconnected from the port.

6. In a train pipe coupler, a hanger, a rod extending transversely of the hanger, a spring mounted upon the rod, a coupler member associated with the hanger and capable of movement relative thereto, followers mounted upon the rod and spaced yieldingly apart by the spring, and means communicating motion from the coupler members to the followers.

7. In a train pipe coupler, a hanger, a rod extending transversely of the hanger, followers slidably mounted upon the rod, a spring mounted upon the rod, and engaging and spacing the followers, a coupler member provided with an opening embracing the rod and spring, and flexible means connecting the coupler member and followers.

8. In a train pipe coupler, a hanger, a rod extending transversely of the hanger, followers slidably mounted upon and adjacent opposite ends of the rod, a spring mounted upon the rod and adapted to hold the followers yieldingly in spaced relation, a coupler member provided with an opening embracing the spring and rod, eye-bolts extending laterally upon opposite sides of the coupling member, and flexible means connecting the eye-bolts and followers.

9. In a device of the class described, a contact face provided with a port, a perforate cup disposed adjacent the port, and a ball valve proportioned to close the port and to be seated within the perforate cup.

10. In a device of the class described, a coupler member provided with a port, a gasket encircling the port, a perforate cup disposed within the coupler member, and adjacent the port and a ball valve adapted to normally close the port and to be forced out of such closing position to seat in the cup.

11. In a train pipe coupler, a contact member provided with a port, a yielding gasket encircling the port, a sleeve provided with an outturned flange disposed within the port and with the flange in retaining contact with the outer side of the gasket, means for limiting the outward movement of the sleeve and means to permit the inward movement of the sleeve when the gasket is compressed.

In testimony whereof we affix our signatures in presence of two witnesses.

WILLIAM A. ORR.
HUBERT D. JOHNSON.

Witnesses:
P. F. RYAN,
EDWARD SCRANTES.